(12) United States Patent
Maalouf

(10) Patent No.: US 11,077,643 B1
(45) Date of Patent: Aug. 3, 2021

(54) FRAME MATERIAL FOR DRONES AND OTHER UNMANNED AIRCRAFT, AND DRONE FRAME MADE FROM SUCH MATERIAL

(71) Applicant: Tarek Maalouf, Spring, TX (US)

(72) Inventor: Tarek Maalouf, Spring, TX (US)

(*) Notice: Subject to any disclaimer, the term of this patent is extended or adjusted under 35 U.S.C. 154(b) by 136 days.

(21) Appl. No.: 16/601,986

(22) Filed: Oct. 15, 2019

Related U.S. Application Data

(60) Provisional application No. 62/745,632, filed on Oct. 15, 2018.

(51) Int. Cl.
| | |
|---|---|
| *B32B 7/12* | (2006.01) |
| *B32B 27/12* | (2006.01) |
| *B32B 37/12* | (2006.01) |
| *B32B 37/18* | (2006.01) |
| *B32B 38/00* | (2006.01) |
| *B32B 27/30* | (2006.01) |

(Continued)

(52) U.S. Cl.
CPC ............... *B32B 7/12* (2013.01); *B32B 5/02* (2013.01); *B32B 27/12* (2013.01); *B32B 27/308* (2013.01); *B32B 27/365* (2013.01); *B32B 37/10* (2013.01); *B32B 37/12* (2013.01); *B32B 37/142* (2013.01); *B32B 37/18* (2013.01); *B32B 38/0004* (2013.01); *B64C 39/024* (2013.01); *B64D 47/02* (2013.01); *B64F 5/10* (2017.01); *B32B 38/10* (2013.01); *B32B 2038/0076* (2013.01); *B32B 2262/106* (2013.01); *B32B 2305/34* (2013.01); *B32B 2305/72* (2013.01); *B32B 2307/412* (2013.01); *B32B 2307/422* (2013.01); *B32B 2313/04* (2013.01); *B32B 2333/04* (2013.01); *B32B 2369/00* (2013.01); *B32B 2457/00* (2013.01); *B32B 2605/006* (2013.01); *B32B 2605/18* (2013.01); *B64C 2001/0072* (2013.01); *B64C 2201/027* (2013.01); *B64D 2203/00* (2013.01)

(58) Field of Classification Search
CPC . B32B 7/12; B32B 2605/18; B32B 2605/006; B64D 47/02; B64D 47/04; B64D 2203/00
See application file for complete search history.

(56) References Cited

U.S. PATENT DOCUMENTS

| | | | | |
|---|---|---|---|---|
| 3,614,029 A | * | 10/1971 | Eickmann ............... | B64C 11/00 244/17.23 |
| 4,937,125 A | * | 6/1990 | Sanmartin ............... | B32B 3/12 428/116 |

(Continued)

FOREIGN PATENT DOCUMENTS

FR          2772624 A1 *  6/1999  ............. A63C 17/01

*Primary Examiner* — Daniel I Walsh

(57) ABSTRACT

A drone frame includes first and second carbon fiber layers, and a center clear layer positioned between the first and second carbon fiber layers. A cutout is formed through an entire thickness of the first carbon fiber layer so as to expose a portion of the center clear layer. An LED unit is positioned in the cutout. The LED unit has a plurality of LEDs on a bottom thereof such that the LEDs abut the center clear layer. Light is transmitted from the LEDs through the center clear layer so as to illuminate the perimeter of the drone frame. A composite material used in the drone frame and a method of forming the composite material and drone frame are also disclosed.

18 Claims, 3 Drawing Sheets

(51) Int. Cl.
  *B32B 27/36*   (2006.01)
  *B32B 37/10*   (2006.01)
  *B64C 39/02*   (2006.01)
  *B64D 47/02*   (2006.01)
  *B64F 5/10*    (2017.01)
  *B32B 5/02*    (2006.01)
  *B32B 37/14*   (2006.01)
  *B32B 7/14*    (2006.01)
  *B64C 1/00*    (2006.01)
  *B32B 38/10*   (2006.01)

(56) References Cited

U.S. PATENT DOCUMENTS

| | | | |
|---|---|---|---|
| 5,741,456 A * | 4/1998 | Ayrton | B23K 26/382 |
| | | | 264/400 |
| 8,473,125 B2 | 6/2013 | Rischmuller et al. | |
| 9,004,973 B2 | 4/2015 | Condon et al. | |
| D763,133 S | 8/2016 | Ketcher | |
| 10,011,353 B1 * | 7/2018 | Beckman | B64C 39/024 |
| 10,137,357 B1 * | 11/2018 | Rosolowski | B32B 21/14 |
| 10,179,647 B1 * | 1/2019 | Meugnier | H05K 7/1417 |
| 10,750,733 B1 * | 8/2020 | Garner | B64D 47/02 |
| 2002/0106952 A1 * | 8/2002 | Hashizume | B29C 45/14786 |
| | | | 442/43 |
| 2006/0141260 A1 * | 6/2006 | Haque | D04H 1/4218 |
| | | | 428/412 |
| 2006/0273531 A1 * | 12/2006 | Jenkins | A63C 17/1427 |
| | | | 280/11.19 |
| 2008/0196369 A1 * | 8/2008 | Bergami | B01D 46/521 |
| | | | 55/385.3 |
| 2008/0226846 A1 * | 9/2008 | Hill | G09F 1/065 |
| | | | 428/13 |
| 2010/0109266 A1 * | 5/2010 | Jenkins | A63C 17/1427 |
| | | | 280/11.204 |
| 2013/0101822 A1 * | 4/2013 | Kunal | B32B 27/40 |
| | | | 428/219 |
| 2014/0196198 A1 * | 7/2014 | Cohen | F41H 1/04 |
| | | | 2/414 |
| 2015/0099411 A1 * | 4/2015 | Yang | B32B 27/12 |
| | | | 442/1 |
| 2016/0129998 A1 * | 5/2016 | Welsh | B64C 27/24 |
| | | | 244/12.3 |
| 2016/0194069 A1 * | 7/2016 | Taylor | B64F 5/10 |
| | | | 244/17.23 |
| 2016/0339669 A1 * | 11/2016 | Miyoshi | C08J 5/043 |
| 2016/0376004 A1 * | 12/2016 | Claridge | B64C 27/08 |
| | | | 701/3 |
| 2017/0113800 A1 * | 4/2017 | Freeman | B64C 25/52 |
| 2017/0183074 A1 * | 6/2017 | Hutson | B64C 1/061 |
| 2017/0203479 A1 * | 7/2017 | Laurin | B29C 45/14811 |
| 2017/0320570 A1 * | 11/2017 | Horn | B64C 29/02 |
| 2017/0341776 A1 * | 11/2017 | McClure | G05D 1/102 |
| 2018/0099479 A1 * | 4/2018 | Abbatiello | B32B 5/12 |
| 2018/0104567 A1 * | 4/2018 | Treadway | A63C 17/015 |
| 2018/0170553 A1 * | 6/2018 | Wang | B64D 13/006 |
| 2018/0208070 A1 * | 7/2018 | Sanchez | B64C 39/024 |
| 2018/0311931 A1 * | 11/2018 | Wodzinski | B32B 29/02 |
| 2018/0328895 A1 * | 11/2018 | Brelati | G01N 29/2431 |
| 2019/0127064 A1 * | 5/2019 | Beardsley | B05B 15/652 |
| 2020/0151534 A1 * | 5/2020 | Lotya | G06K 19/0723 |
| 2021/0114333 A1 * | 4/2021 | Yang | B32B 5/024 |

\* cited by examiner

FRAME MATERIAL FOR DRONES AND OTHER UNMANNED AIRCRAFT, AND DRONE FRAME MADE FROM SUCH MATERIAL

RELATED U.S. APPLICATIONS

The present application claims priority to U.S. Provisional Application No. 62/645,632, filed on Oct. 15, 2018, and entitled "Frame Material for Drones and Other Unmanned Aircraft".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of unmanned aircraft. More particularly, the present invention relates to a material used for in the construction of drones, and in particular, quadcopter drones. Even more particularly, the present invention relates to a material used for construction of drones which also provides for efficient lighting of the drones.

2. Description of Related Art Including Information Disclosed Under 37 CFR 1.97 And 37 CFR 1.98

Unmanned aircraft are increasingly used and produced throughout the world for both civilian and military applications. Unmanned aircraft can range from remote-controlled drones operated by military personnel which are capable of remotely carrying out warfare without a pilot, to simple and inexpensive toy drones which can be operated by children.

In civilian applications drones are very popular. As noted above, these drones to take the form of toys used by children, but can also be utilized for important tasks such as remote inspection of buildings, pipelines, disaster sites, and the like. Another popular civilian use of drones is for videography and photography, wherein cameras are mounted on the drone.

Another civilian application drones, and in particular quadcopter drones, is racing. A hobby culture has developed around such quadcopter racing drones.

Various patents issued in the past related to quadcopters and other personal use drones. For example, U.S. Pat. No. 8,473,125, issued on Jun. 25, 2013 to Rischmuller et al., describes a method of piloting a quadcopter drone to follow a curvilinear turn. This method involves selective operation of the four motors of the drone so as to produce a curvilinear path based on a remote control command.

U.S. Design Application Patent No. D763,133, which issued on Aug. 9, 2016 to Ketcher illustrates an example of a quadcopter drone, and in particular illustrates a ring structure associated with each of the motors of the quadcopter drone.

U.S. Pat. No. 9,004,973, which issued on Apr. 14, 2015 to Condon et al. discloses another example of a quadcopter drone. The quadcopter drone in this patent uses a somewhat unique exterior circular frame. An inner frame and arms of the drone connect to the exterior circular frame at each of the rotor motors. This patent clearly illustrates the basic characteristics of conventional quadcopter drones, wherein four rotor/motor assemblies are positioned about a center frame.

With increased drone use throughout the world, night flying and low-light flying has become a necessity in various industries and applications. For example, the inventor and applicant of the present application is working with police departments in various cities and states to develop a drone that can fly through different hazardous conditions in order to analyze hostile situations from a safe distance. The drone requires necessary markers and lights so that people near the drone can identify it, mark a safe distance from it, and also in cases where the drone becomes lost, locate it relatively easily. As can be appreciated, night flying and low-light flying is also very important to the hobby culture.

As such, it is an object of the present invention to provide a composite drone frame material which provides for night flying and the low light flying.

It is another object of the present invention to provide a drone lighting system which is efficient and keeps lighting components well hidden and out of the way of debris and elements that could interfere with the lighting.

It is another object of the present invention to provide a lighted composite frame material which can be assembled in a cost-effective manner.

It is another object of the present invention provide a lighted composite frame material which is both lightweight and strong.

It is another object of the present invention to provide a composite frame material which avoids catastrophic cracking upon a crash of the drone.

It is another object of the present invention to provide a lighted composite frame material which distributes light evenly around the frame of the drone.

These and other objects and advantages of the present invention will become apparent from a reading of the attached specification and appended claims.

BRIEF SUMMARY OF THE INVENTION

One embodiment of the present invention is a composite material for use with drones or other unmanned aircraft. The composite material includes: a top carbon fiber sheet; a bottom carbon fiber sheet; and a center sheet of clear material positioned between the top carbon fiber sheet and the bottom carbon fiber sheet. Adhesives are applied between the top carbon fiber sheet and the center sheet of clear material and the bottom carbon fiber sheet such that the sheets are secured together.

In an embodiment, a recess is formed in the composite material in the top carbon fiber sheet or the bottom carbon fiber sheet so as to expose a portion of the center sheet of clear material. An LED unit is preferably positioned within the recess. The LED unit has a plurality of LEDs on a bottom thereof. The plurality of LEDs are positioned adjacent the center sheet of clear material. Preferably, a top of the LED unit is flush with the top carbon fiber sheet or the bottom carbon fiber sheet.

In an embodiment, the adhesives are layers of resin applied between the respective sheets.

In an embodiment, the center sheet of clear material is selected from a group consisting of: acrylic and polycarbonate.

In an embodiment, each of the top carbon fiber sheet and the bottom carbon fiber sheet and the center sheet of clear material have a thickness of approximately 2 millimeters.

The present invention is also a drone frame comprising: a first carbon fiber layer; a second carbon fiber layer; a center clear layer positioned between the first carbon fiber layer and the second carbon fiber layer; a cutout formed through an entire thickness of the first carbon fiber layer so as to expose a portion of the center clear layer; and an LED unit positioned in the cutout, the LED unit having a plurality of LEDs on a bottom thereof; the bottom of the LED unit abutting the center clear layer.

In an embodiment, the drone frame includes a plurality of arms extending outwardly from a center of the drone frame, wherein the cutout is formed at the center of the drone frame. Preferably, each of the plurality of arms have a plurality of mounting holes formed at respective ends thereof remote from the center.

In an embodiment, a first adhesive layer is provided between the first carbon fiber layer and the center clear layer, and a second adhesive layer is provided between the center clear layer and the second carbon fiber layer. The first and second adhesive layers preferably comprise resin layers.

In an embodiment, the LED unit is mounted flush with an exposed top surface of said the carbon fiber layer.

In an embodiment, the LED unit is programmable.

In an embodiment, the center clear layer formed is of a material selected from a group consisting of: acrylic and polycarbonate.

In an embodiment, each of the first carbon fiber layer and the second carbon fiber layer and the center clear layer have a thickness of approximately 2 millimeters.

In an embodiment, a plurality of cutouts are formed on respective arms of the plurality of arms; and a plurality of LED units are positioned in respective cutouts of the plurality of cutouts.

The present invention is also a method of constructing a frame for an unmanned aircraft comprising the following steps: (1) providing a top carbon fiber sheet, a bottom carbon fiber sheet and a clear sheet; (2) applying a resin to the various sheets and layering them such that the center clear sheet is positioned over the bottom carbon fiber sheet, and the top carbon fiber sheet is positioned over the center clear sheet; (3) curing the layered sheets; (4) pressing the cured layered sheets so as to form a composite material; and (5) cutting the composite material in a desired shape so as to form the frame.

In an embodiment, the method of the present invention includes forming at least one recess in one of the top carbon fiber sheet and the bottom carbon fiber sheet so as to expose a portion of the clear sheet; and positioning an LED unit within the at least one recess.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
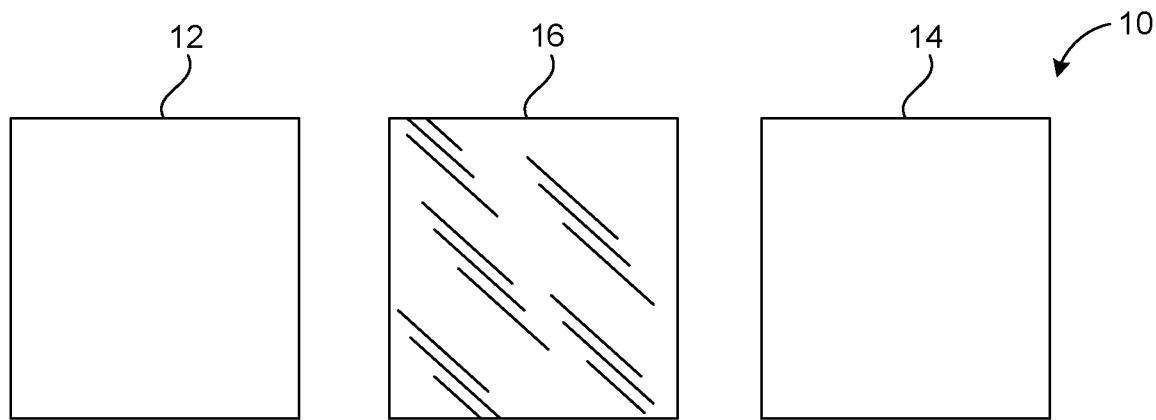
FIG. 1 is a plan view showing the various components of the drone frame material of the preferred embodiment the present invention.

Referring to FIG. 1, there are shown components of the composite frame material for drones and other unmanned aircraft of the preferred embodiment of the present invention. The composite frame material 10 includes a top carbon fiber sheet 12, a bottom carbon fiber sheet 14, and a center clear sheet 16. The center clear sheet 16 is preferably in the form of an acrylic or polycarbonate material and is generally transparent or translucent. The center clear sheet 16 is preferably of the same or similar dimensions as the top carbon fiber sheet 12 and the bottom carbon fiber sheet 14. In common applications, the carbon fiber sheets 12 and 14 have 2 millimeter thicknesses, as does the center clear sheet 16. As such, the combined thickness of 6 millimeter of the final assembly provides for an ideal thickness for use in many quadcopter drones.

Figure 2:
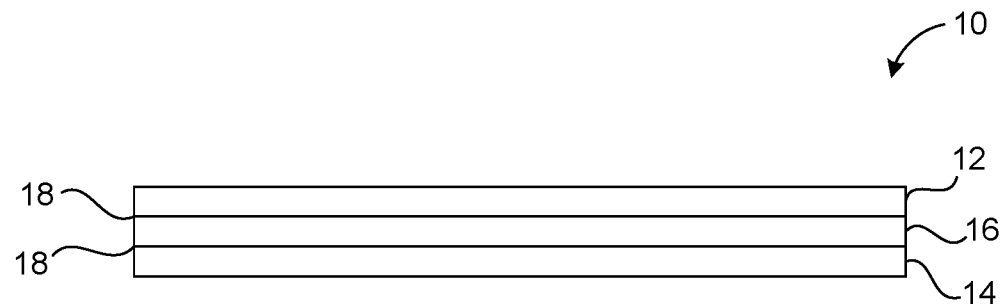
FIG. 2 is a side view of an assembled sheet of drone frame material in accordance with the preferred embodiment of the present invention.

FIG. 2 shows the assembly of the composite frame material 10 of the present invention. In FIG. 2, it can be seen how the various sheets are stacked and layered such that the center clear sheet 16 is positioned between the top carbon fiber sheet 12 and the bottom carbon fiber sheet 14. Adhesives or resin layers 18 are applied between the various sheets so as to strongly secure the sheets together. In the method of the present invention, the resin or other adhesive is applied to the surface of either of the carbon fiber sheets 12 and 14 or the center clear sheet 16, and the sheets are stacked so as to form an assembled sheet. These assembled sheets are then allowed to cure and/or are pressed. Preferably, a 20 ton press is used on the assembled sheets. The assembled composite material 10 may be provided to the consumer, who can cut the sheets into a desired shape.

Within the concept of the present invention, different materials can be used in place of the carbon fiber sheets or acrylic or polycarbonate sheets, such as aluminum, balsa wood, or styrofoam. Different materials could be used to achieve desired results for different specifications and applications.

Within the concept of the present invention, the center clear sheet 16 could also be omitted, such that the top carbon fiber sheet 12 and the bottom carbon fiber sheet 14 are affixed directly to each other. This would result in a 4 millimeter-thick assembled carbon fiber sheet which would be extremely strong and durable.

An advantage of a layered 4 millimeter carbon fiber sheet in accordance with the present invention (i.e. comprised of two layered 2 millimeter carbon fiber sheets) over a standard 4 millimeter carbon fiber sheet would be that the layered carbon fiber sheet would have more flex than the standard carbon fiber sheet, but would otherwise have similar strength.

Use of the material of the present invention is especially beneficial in the event that a drone crashes. An extremely rigid frame made of a standard carbon fiber sheet may crack since flexing cannot occur, whereas the material of the present invention has a degree of flex, resulting in a potentially less catastrophic crash. This quality and benefit makes the present invention particularly desirable, as purchase of a pre-assembled drone can be very expensive, and assembly of a drone from parts can be both time-consuming and very expensive.

Figure 3:
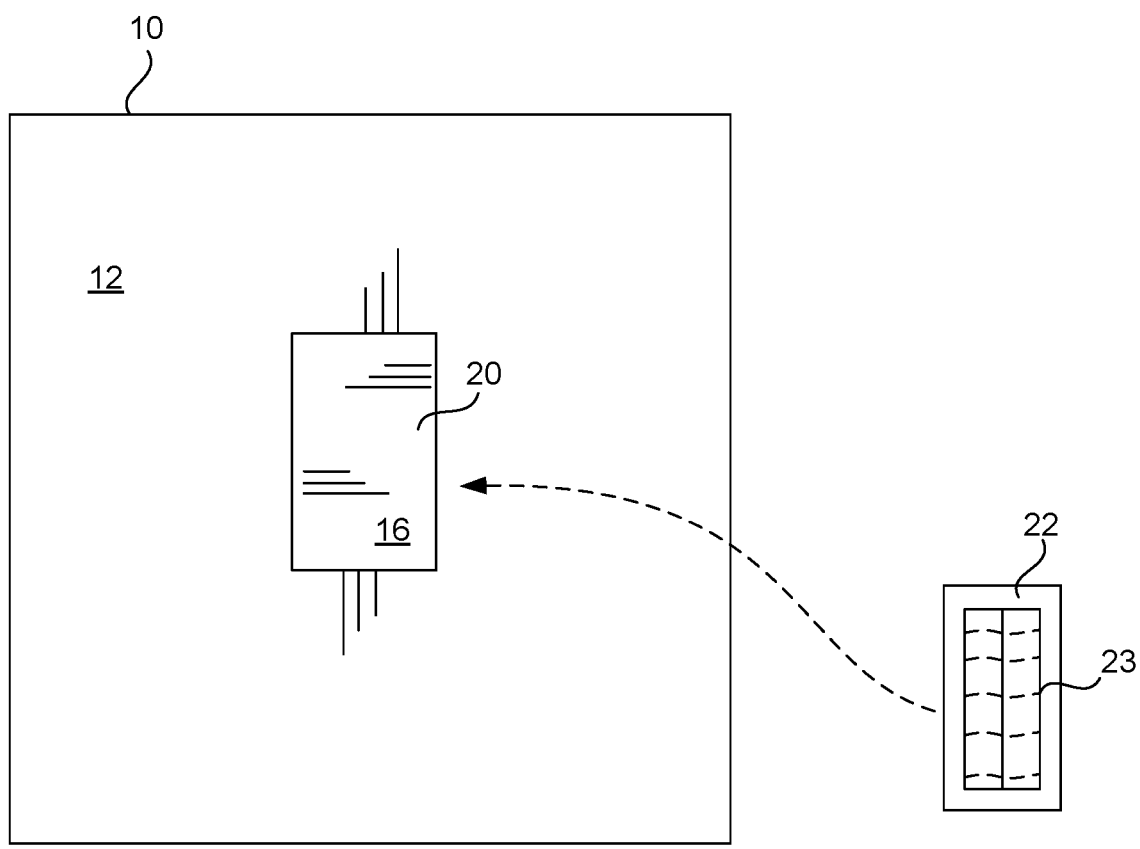
FIG. 3 is a top view of one embodiment of the drone frame material of the present invention, wherein LED units are provided.

FIG. 3 shows a top view of the preferred embodiment of the composite frame material 10 of the present invention. In FIG. 3, it can be seen how a cutout or recess 20 has been cut into the top carbon fiber sheet 12. Alternatively, the recess 20 could be cut into the bottom carbon fiber sheet 14. With the recess 20 cut, a surface of the center clear sheet 16 is exposed.

The shape of the recess 20 is cut so as to match an LED unit 22. The LED unit 22 is then positioned and affixed into the recess 20 such the top of the LED unit 22 is preferably flush with the surface of the top carbon fiber sheet 12. The bottom face of the LED unit 22 has LED lights 23 thereon, and abuts the surface of the center clear sheet 16. This keeps the LED components and the lights 23 hidden and out-of-the-way of debris and other elements that could interfere with the operation of the LED unit 22.

With the positioning of the LED unit 22 against the center clear sheet 16, when the LED unit 22 is turned on, light emitted from the LED lights of the LED unit 22 is diffused through the center clear sheet 16 so as to shine out of each of the exposed sides of the center clear sheet 16. This provides for an even lighting around the perimeter of the assembly 10 which can be cut in a desired shape. The use of the center clear sheet 16 allows for minimal LEDs to be utilized so as to produce a greater amount of light around the sheet and the quadcopter or other drone constructed of the sheet.

Due to the relative thinness of the center clear sheet 16 as compared to the entire thickness of the assembled sheet material, the center clear sheet 16 is almost invisible to the human eye when the lights of the LED unit 22 are off. However, when the lights are activated, the center of the frame lights up very bright and can be identified easily.

The LED unit 22 is preferably programmable such that limitless colors and patterns of colors can be displayed. This can be useful for a number of applications. In the law enforcement field, for example, the lights can be programmed to cycle between blue and red lights.

In the prior art, the standard way to add lighting to a drone is to place the LED units on the frame directly. This LED lighting is susceptible to damage from accidents and also becomes unidirectional, which means more lights must be added to be visible from all sides of the drone. The method and assembly of the present invention obviates both these problems by easily distributing the light from one central location and also by protecting the LED lights by inverting them and sinking them into the frame and against the center clear sheet 16.

Figure 4:
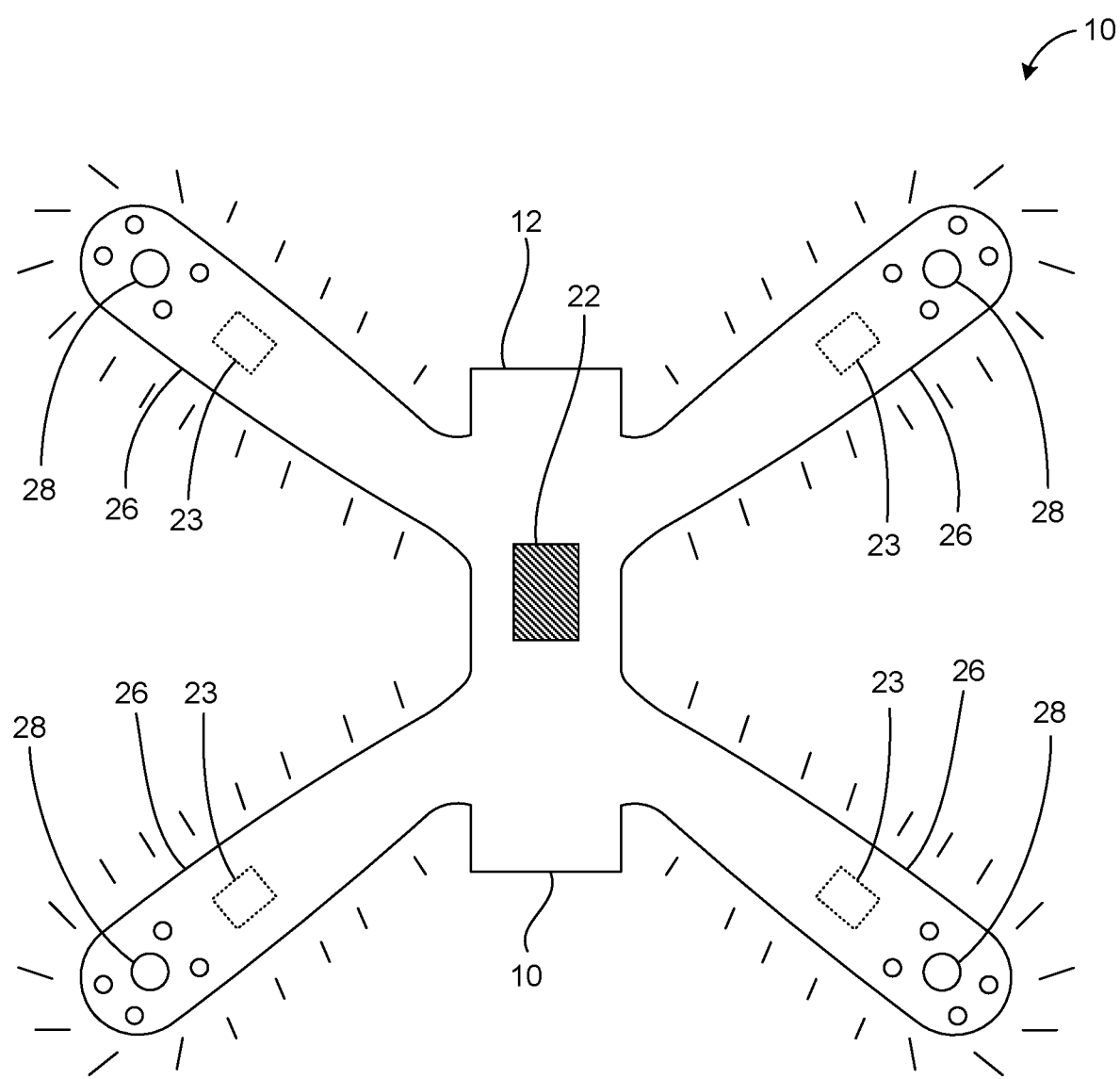
FIG. 4 is a top view of an example drone frame formed of the drone frame material of the preferred embodiment of the present invention.

Referring to FIG. 4, there is shown an embodiment of the present invention wherein a drone frame 24 has been cut from the composite material sheet 10 of the present invention. The frame 24 has four arms 26 extending outwardly therefrom. Each of the four arms 26 has mounting holes 28 thereon so as to allow for mounting of the motor and rotors assemblies of the drone. The LED unit 22 is shown at the center of the cut frame 24. However, the LED unit 22 could be positioned in a place other than the center of the frame. Other components of the quadcopter drone would then be assembled onto the frame, including the circuit board and power supply.

FIG. 4 also illustrates how light from the LED unit 22 would be evenly distributed outwardly from the center of the frame 24. Importantly, the center clear sheet 16 is visible along an entirety of the perimeter of the frame 24.

Within the concept of the present invention, multiple recesses and LED units can be provided on the drone fame 24. FIG. 4 illustrates an example wherein recesses 23 (shown in dotted lines) are formed on each of the four arms 26.

As noted above, one major application for drone technology, and in particular for the present invention, would be the racing and competition industry. By adding the center clear piece 16 (acrylic or polycarbonate) to the frame, the amount of carbon fiber needed for strength and durability is greatly reduced. For example, if the drone were designed to be 6 millimeters thick, conventional construction techniques would require one 6 millimeter piece of carbon fiber sheeting, which alone would cost over $200.

However, by reducing the carbon fiber requirements with the method and assembly of the present invention, the layered clear and carbon fiber sheets would comprise two 2-millimeter carbon fiber sheets and a one 2-millimeter acrylic or polycarbonate sheet for the center, achieving a 6 millimeter thickness in a far more cost-effective manner. Approximate prices for the three sheets (carbon fiber and acrylic or polycarbonate) would be $36 total as compared to the over $200 for single 6 millimeter carbon fiber sheet.

The lighting on the drone provides for a number of advantages and uses, including in the competitive racing field. For example, in the competitive racing field, the lighting may be used to identify the different drone teams. Using the lighted material of the present invention, the colors on the drone are more easily identified since the entire frame lights up as opposed to a single section of the drone.

Overall, the material of the present invention provides a relatively inexpensive way to achieve the strength of thick carbon fiber sheets. The material has the added benefit that it also flexes more than a typical carbon fiber construction, reducing cost risks associated with operating the aircraft. Together with the novel lighting of the present invention, these advantages make the material of the present invention an attractive option for drone construction in a number of applications.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A composite material for use with drones or other unmanned aircraft, the composite material comprising:
    a top carbon fiber sheet;
    a bottom carbon fiber sheet; and
    a center sheet of clear material positioned between said top carbon fiber sheet and said bottom carbon fiber sheet, wherein adhesives are applied between said top carbon fiber sheet and said center sheet of clear material and said bottom carbon fiber sheet such that the sheets are secured together; a recess formed in the composite material in said top carbon fiber sheet or said bottom carbon fiber sheet so as to expose a portion of said center sheet of clear material, and wherein a plurality of LEDs of an LED unit are positioned within said recess, the composite material forming part of a drone or unmanned aircraft.

2. The composite material of claim 1, further comprising:
wherein, said plurality of LEDs being positioned adjacent said center sheet of clear material.

3. The composite material of claim 2, a top of said LED unit being flush with said top carbon fiber sheet or said bottom carbon fiber sheet.

4. The composite material of claim 1, said adhesives comprising layers of resin applied between the respective sheets.

5. The composite material of claim 1, said center sheet of clear material being selected from a group consisting of: acrylic and polycarbonate.

6. The composite material of claim 1, wherein each of said top carbon fiber sheet and said bottom carbon fiber sheet and said center sheet of clear material have a thickness of approximately 2 millimeters.

7. A drone frame comprising:
a first carbon fiber layer;
a second carbon fiber layer;
a center clear layer positioned between said first carbon fiber layer and said second carbon fiber layer;
a cutout formed through an entire thickness of said first carbon fiber layer so as to expose a portion of said center clear layer; and
an LED unit positioned in said cutout, said LED unit having a plurality of LEDs on a bottom thereof; said bottom of said LED unit abutting said center clear layer, and wherein said drone frame is part of a drone or unmanned aircraft.

8. The drone frame of claim 7, further comprising:
a plurality of arms extending outwardly from a center of the drone frame, said cutout being formed at said center of the drone frame.

9. The drone frame of claim 8, each of said plurality of arms having a plurality of mounting holes formed at respective ends thereof remote from said center.

10. The drone frame of claim 7, wherein a first adhesive layer is provided between said first carbon fiber layer and said center clear layer, and wherein a second adhesive layer is provided between said center clear layer and said second carbon fiber layer.

11. The drone frame of claim 10, said first and second adhesive layers comprising resin layers.

12. The drone frame of claim 7, said LED unit mounted flush with an exposed top surface of said first carbon fiber layer.

13. The drone frame of claim 7, said LED unit being programmable.

14. The drone frame of claim 7, said center clear layer formed of a material selected from a group consisting of: acrylic and polycarbonate.

15. The drone frame of claim 7, each of said first carbon fiber layer and said second carbon fiber layer and said center clear layer having a thickness of approximately 2 millimeters.

16. The drone frame of claim 8, further comprising:
a plurality of cutouts formed on respective arms of said plurality of arms; and
a plurality of LED units positioned in respective cutouts of said plurality of cutouts.

17. The drone frame of claim 7, said center clear layer being visible along an entirety of a perimeter of the drone frame.

18. A method of constructing a frame for an unmanned aircraft comprising the following steps:
providing a top carbon fiber sheet, a bottom carbon fiber sheet and a clear sheet;
applying a resin to the various sheets and layering them such that the center clear sheet is positioned over the bottom carbon fiber sheet, and the top carbon fiber sheet is positioned over the center clear sheet;
curing the layered sheets;
pressing the cured layered sheets so as to form a composite material;
forming at least one recess in one of said top carbon fiber sheet and said bottom carbon fiber sheet so as to expose a portion of said clear sheet;
positioning an LED unit within said at least one recess; and
cutting the composite material in a desired shape so as to form the frame for the unmanned aircraft.

* * * * *